3,835,067
METHOD FOR INTERCALATING CHROMIUM TRIOXIDE ($CrO_3$) IN GRAPHITE
Bernd Schneider, Beverly, Mass., assignor to Ventron Corporation, Beverly, Mass.
No Drawing. Filed Feb. 20, 1973, Ser. No. 333,739
Int. Cl. B01j 11/06
U.S. Cl. 252—447      3 Claims

ABSTRACT OF THE DISCLOSURE

The invention provides a method for intercalating graphite in chromium trioxide ($CrO_3$) on a commercial scale. The method involves heating a layer of a mixture of particles of graphite and chromium trioxide at a temperature above 180° C. but below 250° C. until the intercalation is complete as shown by the change in color from brownish black to bluish black. It is essential that the thickness of the layer of the mixture shall not be greater than about three eighths of an inch and, preferably, about one quarter inch.

---

The invention relates to a method for intercalating chromium trioxide ($CrO_3$) in graphite on a commercial scale. The resulting product is useful for the selective oxidation of primary alcohols to aldehydes.

It was known prior to the present invention that graphite could be intercalated in chromium trioxide ($CrO_3$) on a laboratory scale (J. M. LaLancette, G. Rollin, and P. Dumas, Canadian Journal of Chemistry, Vol. 50, 1972). However, prior to the present invention, attempts to intercalate graphite in chromium trioxide ($CrO_3$) on a large scale resulted in failure, the $CrO_3$ oxidizing the graphite in a violent reaction which generated copious amounts of CO and $CO_2$ (Experiment 4).

I have discovered that the intercalation reaction of graphite in chromium trioxide can proceed smoothly and safely on a commercial scale if a mixture of particles of graphite and $CrO_3$ is maintained in a thin layer on a suitable inert support, such as glass or stainless steel, while being heating preferably under atmospheric pressure at a temperature above 180° C. but below 250° C. The thickness of the layer should be less than one half inch and, preferably, should not exceed about three eighths of an inch. The layer may lay in a plane or in some other form, such as helical form. The particle size of the $CrO_3$ and graphite is not critical but the larger the size of the particles the slower the intercalating reaction. The mixture preferably should contain one part by weight of $CrO_3$ to one part by weight of graphite. I prefer to employ both the graphite and $CrO_3$ in a particle size of the order of −14 mesh.

Crystalline graphite suitable for this invention may be either the naturally occurring material or synthetically produced material. It is necessary that it give the normal X-ray diffraction pattern for crystalline graphite where the distance between graphite planes is about 3.35 A.

When the intercalating reaction is completed as indicated by the change in color of the mixture, the reaction product is cooled and the excess $CrO_3$ washed out with water and then with acetone. The washed material then is dried at a suitable temperature, such as about 130° C.

The invention is illustrated further by the following examples:

1. Graphite (−14 mesh, >90% graphitic carbon by X-ray analysis) was intimately mixed with an equal amount of chromium trioxide $CrO_3$ (−14 mesh). The mixture was spread on a hot (200–230° C.) glass tray to one quarter inch thickness and kept at 200° C. for 24 hours. The brownish black powder had changed into a bluish black brittle cake. The chromium oxide was shown to be intercalated quantitatively, by the fact that water did not leach out chromic acid at room temperature within 10 minutes.

2. One part (by weight) of graphite (−14 mesh) and two parts chromium trioxide ($CrO_3$-lumps ¼″ and smaller) were mixed and spread out on a glass tray to ¼″ thickness and heated on a hot plate in air to 180–245° C. for one hour. The excess $CrO_3$ was washed out with water and acetone. The powder was dried at 130° C. for 4 hours. Elemental analysis showed the presence of 49.3% $CrO_3$ intercalated in the product.

3. One part (by weight) of graphite (−20 mesh) and five parts chromium trioxide ($CrO_3$-flakes, ⅟₁₆″ thick, approx. ¼″ diameter) were mixed and spread out on a glass tray in a layer ⅜″ thick. After heating to 180–230° C. for 10 minutes the intercalation was complete. Washinng with $H_2O$ and then acetone followed by drying at 120° C. for 20 hours yielded a black powder with a $CrO_3$ content of 57%.

4. Graphite (−14 mesh) was intimated mixed with an equal amount of chromium trioxide ($CrO_3$ −14 mesh). The mixture was spread on a glass tray to ¾″ thickness and heated to 200° C. on a hot plate. After a few minutes red fumes of $CrO_3$ begin to rise from the surface and seconds later the $CrO_3$ oxidizes the graphite in a violent reaction, generatinng copious amounts of CO and $CO_2$, and a red hot ash of $Cr_2O_3$. The green product contains no $CrO_3$ and only small amounts of graphite.

I claim:

1. The method of intercalating $CrO_3$ into graphite which comprises spreading a mixture of particles of $CrO_3$ and graphite on an inert support in a layer not exceeding about three eighths of an inch in thickness, heating said layer at a temperature above 180° C. but below 250° C. until the intercalating reaction is complete, cooling the reaction mixture, and removing excess $CrO_3$ from the reaction mixture, said mixture containing at least one part by weight of $CrO_3$ to one part by weight of graphite.

2. The method as claimed by claim 1 wherein the thickness of said layer is about one quarter inch.

3. The method as claimed by claim 1 wherein the particle size of the graphite and the $CrO_3$ is between minus 4 and minus 20 mesh.

References Cited
UNITED STATES PATENTS

| | | | |
|---|---|---|---|
| 3,431,067 | 3/1969 | Kato et al. | 252—447 X |
| 3,756,962 | 9/1973 | Brinkel et al. | 252—441 |
| 3,763,043 | 10/1973 | Thompson | 252—428 X |

PATRICK P. GARVIN, Primary Examiner

U.S. Cl. X.R.
260—603 HF